United States Patent
Preissl et al.

(10) Patent No.: US 10,897,275 B2
(45) Date of Patent: Jan. 19, 2021

(54) POLAR MODULATION SYSTEMS AND METHODS

(71) Applicant: Intel Corporation, Santa Clara, CA (US)

(72) Inventors: Christoph Preissl, Linz (AT); Tobias Buckel, Linz (AT); Thomas Mayer, Linz (AT); Peter Preyler, Weyer (AT)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/233,401

(22) Filed: Dec. 27, 2018

(65) Prior Publication Data

US 2020/0212944 A1    Jul. 2, 2020

(51) Int. Cl.
*H04B 1/04*    (2006.01)
*H04L 27/36*   (2006.01)
*H04B 17/11*   (2015.01)

(52) U.S. Cl.
CPC ........... *H04B 1/0475* (2013.01); *H04B 17/11* (2015.01); *H04L 27/361* (2013.01); *H04L 27/366* (2013.01); *H04B 2001/0491* (2013.01)

(58) Field of Classification Search
CPC ..... H04B 1/0475; H04B 17/11; H04L 27/361; H04L 27/366; H04L 2001/0491

USPC ......................................................... 375/295
See application file for complete search history.

(56) References Cited

U.S. PATENT DOCUMENTS

| | | | |
|---|---|---|---|
| 2010/0097071 A1* | 4/2010 | Lee .................. | G01R 31/31725 324/537 |
| 2010/0111222 A1* | 5/2010 | Schimper ............... | H04L 27/367 375/296 |
| 2013/0101075 A1* | 4/2013 | Helmschmidt ......... | H04L 7/042 375/355 |
| 2016/0334506 A1 | 11/2016 | Tua | |
| 2017/0187283 A1 | 6/2017 | Vaidya et al. | |
| 2018/0091177 A1* | 3/2018 | Banin .................. | H04B 1/0475 |

OTHER PUBLICATIONS

Search Report dated Dec. 27, 2019 for International Application No. PCT/US19/54068.

* cited by examiner

*Primary Examiner* — Kevin M Burd
(74) *Attorney, Agent, or Firm* — Schiff Hardin LLP (57) ABSTRACT

In a modulation correction method, an adjusted amplitude is determined based on an amplitude between adjacent zero crossings of a modulated signal, the adjacent zero crossings are shifted to determine shifted zero crossings, and the modulated signal is adapted based on the adjusted amplitude and the shifted zero crossings to generate a corrected modulated signal corresponding to the modulated signal.

20 Claims, 8 Drawing Sheets

Time domain of error signal $y_{ideal}^{DTX}(t) - y^{DTX}(t)$ and its decomposition 605 ● $t_{zeros}^k$
610 —— error e(t)
615 — — error (square part) $e_s(t)$
620 — — error (triangular part) $e_t(t)$

POLAR MODULATION SYSTEMS AND METHODS

BACKGROUND

Field

Aspects described herein generally relate to modulation systems and methods, including polar modulation systems and methods. Aspects are operable in wireless communication devices but are not limited thereto.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As an overview, conventional polar transmitters exhibit significant out-of-band noise through the rectangular to polar conversion. For example, the nonlinear transformation from the complex baseband signal into the polar domain can result in bandwidth expansion of amplitude and phase. Further, because digital polar transmitters generate a square wave signal, spectral replicas of the zero-order-hold amplitude signal are shifted in frequency by the harmonic components of the square wave carrier and can fall on top around the carrier frequency.

Aspects described herein generally relate to polar transmission systems and methods, including modulation correction for polar modulation operations to reduce or remove noise (e.g. out-of-band noise) on the resulting output signal. Aspects can also include wireless networks, wireless communications, and corresponding wireless communication devices implementing one or more polar modulation error correction systems.

The aspects of the present disclosure will be described with reference to wireless systems configured for the millimeter wave (mmWave) spectrum (e.g., 24 GHz-300 GHz), but is not limited thereto. In one or more aspects, the system is configured to operate with a carrier frequency of 71-76 GHz and a carrier signal bandwidth of 2 GHz, but is not limited thereto. The aspects of the present disclosure may be applied to fifth generation (5G) wireless technologies and related spectrums, or other wireless technologies and spectrums as would be understood by one of ordinary skill in the relevant arts.

Wireless communications are expanding into communications having increased data rates (e.g., from Institute of Electrical and Electronics Engineers (IEEE) 802.11a/g to IEEE 802.11n to IEEE 802.11ac and beyond). Currently, 5G cellular communication and Wireless Gigabit Alliance (WiGig) standards are being introduced for wireless cellular devices and/or Wireless Local Area Networks (WLAN).

Some aspects of the present disclosure relate to wireless local area networks (WLANs) and Wi-Fi networks including networks operating in accordance with the Institute of Electrical and Electronics Engineers (IEEE) 802.11 family of standards, such as the IEEE 802.11ac, IEEE 802.11ad and IEEE 802.11ay standards, the IEEE 802.11ax study group (SG) (named DensiFi) and Wireless Gigabit Alliance (WiGig). Other Aspects of the present disclosure pertain to mobile wireless communication devices such as the 4G and 5G cellular communication standards.

Figure 1:
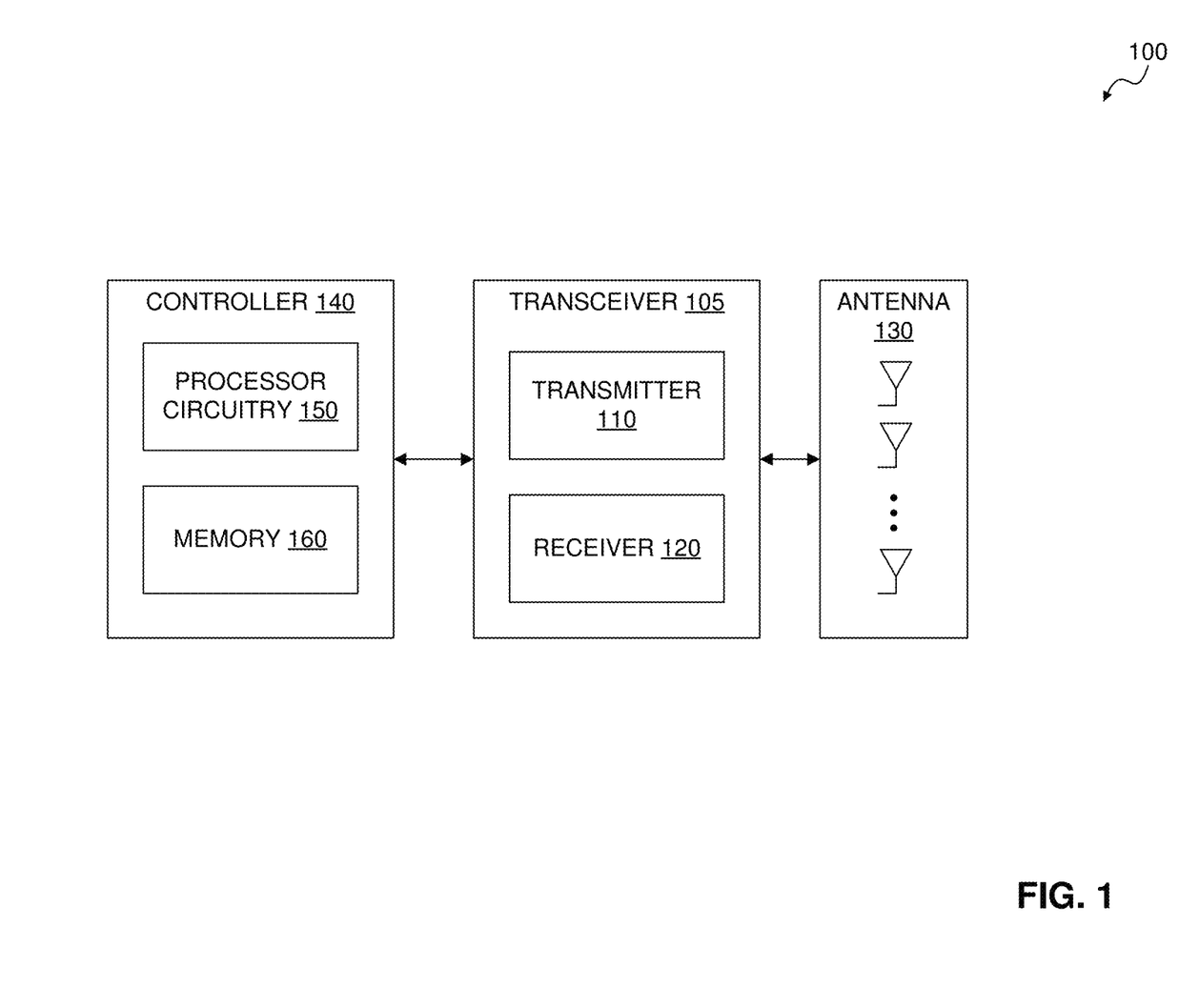
FIG. 1 illustrates a communication device according to exemplary aspects of the present disclosure.

FIG. 1 illustrates a communication device 100 according to an exemplary aspect of the present disclosure. The communication device 100 is configured to transmit and/or receive wireless communications via one or more wireless technologies. For example, the communication device 100 can be configured for wireless communications conforming to, for example, one or more fifth generation (5G) cellular communication protocols, such as 5G protocols that use the 28 GHz frequency spectrum, and/or communication protocols conforming to the Wireless Gigabit Alliance (WiGig) standard, such as IEEE 802.11ad and/or IEEE 802.11ay that use the 60 GHz frequency spectrum. The communication device 100 is not limited to these communication protocols and can be configured for one or more additional or alternative communication protocols, such as one or more 3rd Generation Partnership Project's (3GPP) protocols (e.g., Long-Term Evolution (LTE)), one or more wireless local area networking (WLAN) communication protocols, and/or one or more other communication protocols as would be understood by one of ordinary skill in the relevant arts. For example, the communication device 100 can be configured to transmit and/or receive wireless communications using one or more communication protocols that utilize the millimeter wave (mmWave) spectrum (e.g., 24 GHz-300 GHz), such as WiGig (IEEE 802.11ad and/or IEEE 802.11ay) which operates at 60 GHz, and/or one or more 5G protocols using, for example, the 28 GHz frequency spectrum.

The communication device 100 can be configured to communicate with one or more other communication devices, including, for example, one or more base stations, one or more access points, one or more other communication devices, and/or one or more other devices as would be understood by one of ordinary skill in the relevant arts.

In an exemplary aspect, the communication device 100 includes a controller 140 communicatively coupled to one or more transceivers 105.

The transceiver(s) 105 is configured to transmit and/or receive wireless communications via one or more wireless technologies. In an exemplary aspect, the transceiver 105 includes processor circuitry that is configured for transmitting and/or receiving wireless communications conforming to one or more wireless protocols.

In an exemplary aspect, the transceiver 105 includes a transmitter 110 and a receiver 120 configured for transmitting and receiving wireless communications, respectively, via one or more antennas 130. In aspects having two or more transceivers 105, the two or more transceivers 105 can have their own antenna 130, or can share a common antenna via a duplexer. In an exemplary aspect, the transceiver 105 (including the transmitter 110 and/or receiver 120) is configured to perform one or more baseband processing functions (e.g., media access control (MAC), encoding/decoding, modulation/demodulation, data symbol mapping; error correction, etc.).

In an exemplary aspect, the transmitter 110 is a polar transmitter 110 configured to perform one or more polar modulation operations and the receiver 120 is a Cartesian receiver 120 configured to perform one or more Cartesian demodulation operations (e.g. demodulate in-phase and quadrature phase components of the received signal). In these aspects, the transmitter 110 is a polar transmitter and the receiver 120 is a Cartesian receiver, but the present disclosure is not limited thereto. In other aspects, the receiver 120 is also a polar receiver that is configured to perform one or more polar demodulation operations.

The antenna 130 can include one or more antenna elements forming an integer array of antenna elements. In an exemplary aspect, the antenna 130 is a phased array antenna that includes multiple radiating elements (antenna elements) each having a corresponding phase shifter. The antenna 130 configured as a phased array antenna can be configured to perform one or more beamforming operations that include generating beams formed by shifting the phase of the signal emitted from each radiating element to provide constructive/destructive interference so as to steer the beams in the desired direction.

In an exemplary aspect, the controller 140 includes processor circuitry 150 that is configured to control the overall operation of the communication device 100, such as the operation of the transceiver(s) 105. The processor circuitry 150 may be configured to control the transmitting and/or receiving of wireless communications via the transceiver(s) 105.

In an exemplary aspect, the processor circuitry 150 is configured to perform one or more baseband processing functions (e.g., media access control (MAC), encoding/decoding, modulation/demodulation, data symbol mapping; error correction, etc.) in cooperation with the transceiver 105 or instead of such operations/functions being performed by the transceiver 105. The processor circuitry 150 is configured to run one or more applications and/or operating systems; power management (e.g., battery control and monitoring); display settings; volume control; and/or user interactions via one or more user interfaces (e.g., keyboard, touchscreen display, microphone, speaker, etc.) in one or more aspects.

In an exemplary aspect, the controller 140 further includes a memory 160 that stores data and/or instructions, where when the instructions are executed by the processor circuitry 150, controls the processor circuitry 150 to perform the functions described herein.

The memory 160 may be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 160 can be non-removable or removable, or a combination of both.

Examples of the communication device 100 include (but are not limited to) a mobile computing device (mobile device)—such as a laptop computer, a tablet computer, a mobile telephone or smartphone, a "phablet," a personal digital assistant (PDA), and mobile media player; a wearable computing device—such as a computerized wrist watch or "smart" watch, and computerized eyeglasses; and/or internet-of-things (IoT) device. In some aspects of the present disclosure, the communication device 100 may be a stationary communication device, including, for example, a stationary computing device—such as a personal computer (PC), a desktop computer, television, smart-home device, security device (e.g., electronic/smart lock), automated teller machine, a computerized kiosk, and/or an automotive/aeronautical/maritime in-dash computer terminal.

In one or more aspects, the communication device 100 or one or more components of the communication device 100 is additionally or alternatively configured to perform digital signal processing (e.g., using a digital signal processor (DSP)), modulation and/or demodulation (using a modulator/demodulator), a digital-to-analog conversion (DAC) and/or an analog-to-digital conversion (ADC) (using a respective DA and AD converter), an encoding/decoding (e.g., using encoders/decoders having convolution, tail-biting convolution, turbo, Viterbi, and/or Low Density Parity Check (LDPC) encoder/decoder functionality), frequency conversion (using, for example, mixers, local oscillators, and filters), Fast-Fourier Transform (FFT), preceding, and/or constellation mapping/de-mapping to transmit and/or receive wireless communications conforming to one or more wireless protocols and/or facilitate the beamforming scanning operations and/or beamforming communication operations.

Figure 2:
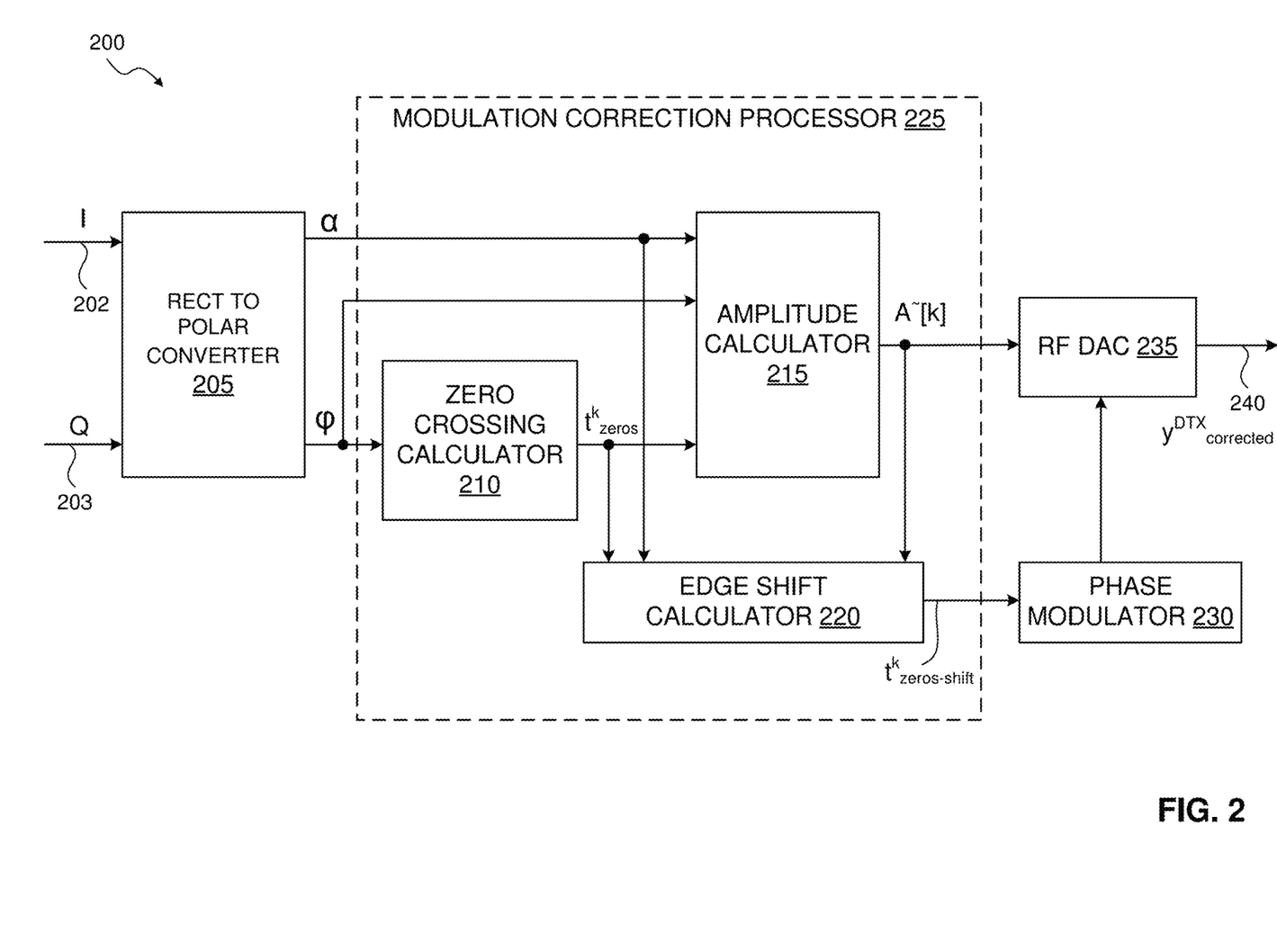
FIG. 2 illustrates a polar transmitter according to an exemplary aspect of the present disclosure.

FIG. 2 illustrates a polar transmitter 200 according to an exemplary aspect of the present disclosure. In an aspect, the polar transmitter 200 is an embodiment of transmitter 110.

In an exemplary aspect, the transmitter 200 includes a rectangular-to-polar converter 205, modulation correction processor 225, phase modulator 230, and radio-frequency (RF) digital-to-analog converter (DAC) 235. In an exemplary aspect, the modulation correction processor 225 includes zero-crossing calculator 210, amplitude calculator 215, and edge-shift calculator 220.

In an exemplary aspect, rectangular-to-polar converter 205 is configured to receive an input signal having an in-phase component 202 and a quadrature component 203, and to convert the rectangular in-phase component (I) 202 and the quadrature component (Q) 203 to polar output signal having amplitude ($\alpha$) and phase ($\varphi$) components. In an exemplary aspect, the rectangular-to-polar converter 205 includes processor circuitry that is configured to convert the rectangular in-phase component (I) 202 and the quadrature component (Q) 203 to polar output signal having amplitude (α) and phase (φ) components. In an exemplary aspect, the rectangular-to-polar converter 205 includes digital circuitry that is configured to convert the rectangular in-phase component (I) 202 and the quadrature component (Q) 203 to polar output signal having amplitude (α) and phase (φ) components. In an exemplary aspect, the rectangular-to-polar converter 205 is a Coordinate Rotation Digital Computer (CORDIC) configured to calculate hyperbolic and trigonometric functions (e.g. Volder's algorithm).

In an exemplary aspect, the amplitude (α) and phase (φ) components are determined based on the following equations:

$$\alpha = \sqrt{I^2 + Q^2}$$

$$\varphi = \tan^{-1}\frac{Q}{I}$$

In an exemplary aspect, the modulation correction processor 225 is configured to receive the amplitude (α) and phase (φ) components from the rectangular-to-polar converter 205, and to correct or otherwise compensate for noise, such as out-of-band noise, included in the amplitude (α) and phase (φ) components as a result of the rectangular to polar conversion. The modulation correction processor 225 is configured to generate a corrected amplitude (α') and a corrected phase (φ') component corresponding to the amplitude (α) and phase (φ) components in which the noise has been reduced or removed. In an exemplary aspect, the modulation correction processor 225 (which can include one or more of the components comprised therein) includes processor circuitry that is configured to correct or otherwise compensate for noise, such as out-of-band noise, included in the amplitude (α) and phase (φ) components of the received signal(s).

In an exemplary aspect, to reduce or remove the noise, the modulation correction processor 225 is configured to: calculate amplitude, phase and zero crossings of a modulated carrier from oversampled I/Q data samples, calculate the area of the error between the RF signal with amplitude being constant for each half LO-cycle and the RF signal with continuous amplitude, and apply a correction pulse train with the same area as the error by modifying the amplitude of each half LO-cycle and by shifting the edge locations of the modulated square wave carrier. Advantageously, transmission of extremely wide-band signals is achieved.

In an exemplary aspect, the phase modulator 230 is configured to receive the corrected phase (φ') component from the modulation correction processor 225 (e.g. $t_{zeros\_shift}^{k}$ from edge shift calculator 220) and the RFDAC 235 is configured to receive the corrected amplitude (α') from the modulation correction processor 225 (e.g. A˜[k] from the amplitude calculator 215).

In an exemplary aspect, the phase modulator 230 is configured to modulate the corrected phase (φ') component to generate one or more phase modulated (e.g. phase shifted) signals (e.g. modulated clock signals). The phase modulated signal(s) may be provided to RFDAC 235. In an exemplary aspect, the phase modulator 230 includes a digital-to-time converter and/or a phased-locked loop (PLL) that is configured to modulate the corrected phase (φ') component to generate one or more phase modulated signals. In an exemplary aspect, the phase modulator 230 includes processor circuitry that is configured to modulate the corrected phase (φ') component to generate one or more phase modulated signals.

In an exemplary aspect, the RFDAC 235 is configured to perform one or more digital-to-analog conversion operations on the corrected phase (φ') component based on the phase modulated signal(s) from the phase modulator 230 to generate an analog RF output signal 240 (e.g. $y_{corrected}^{DTX}$). In an exemplary aspect, the RFDAC 235 includes processor circuitry that is configured to perform one or more digital-to-analog conversion operations on the corrected phase (φ') component based on the phase modulated signal(s) from the phase modulator 230 to generate an analog RF output signal 240.

With reference to FIGS. 3-7, the operation of the modulation correction processor 225 of FIG. 2 according to exemplary aspects will be described.

Figure 3:
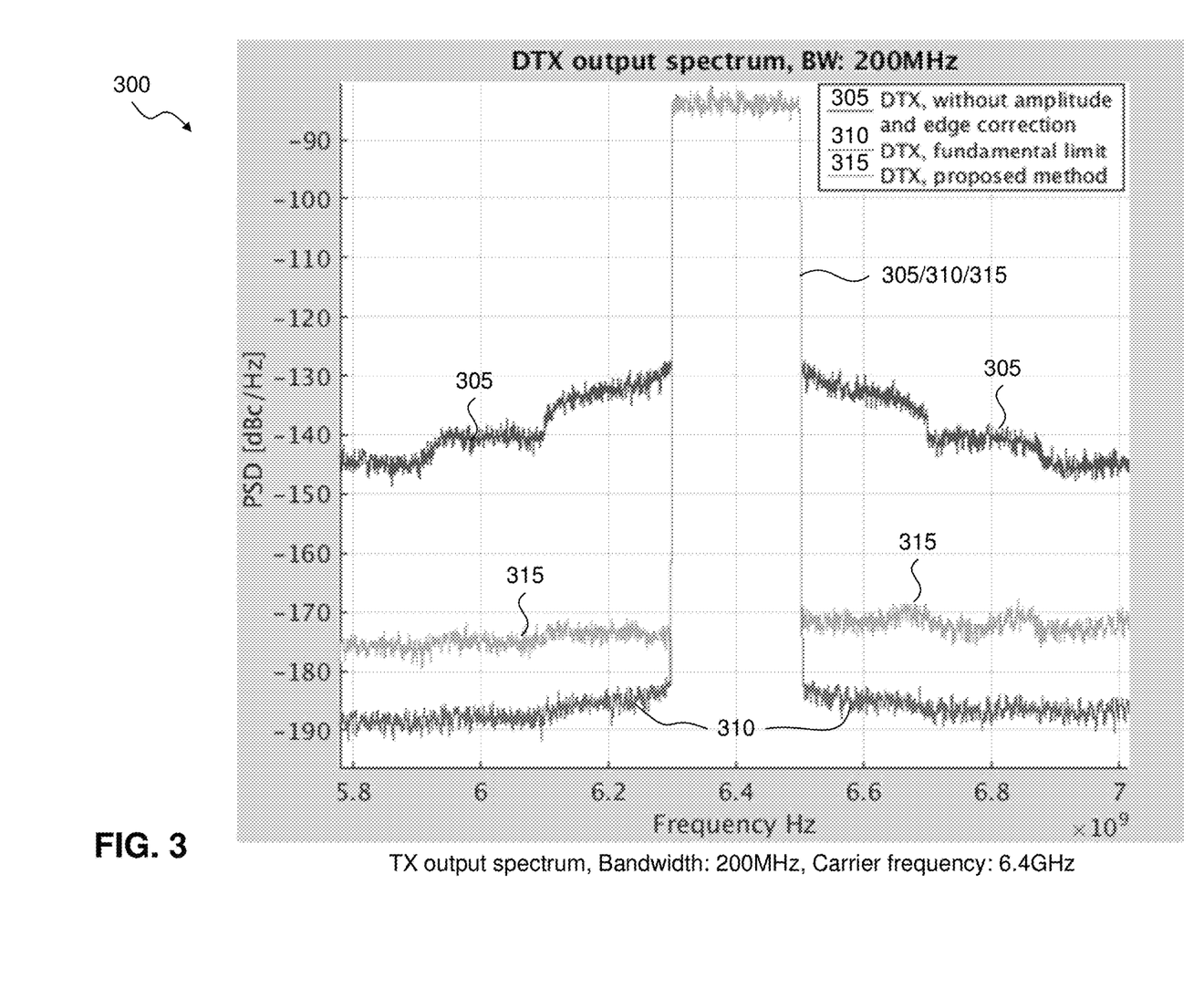
FIG. 3 illustrates a plot of polar transmitter output signals according to an exemplary aspect of the present disclosure.

FIG. 3 illustrates a plot of digital polar transmitter signals 305, 310, and 315 with a carrier frequency of 6.4 GHz and a bandwidth of 200 MHz. The aspects are not limited to this carrier frequency and/or bandwidth as would be understood by one of ordinary skill in the arts.

Signal 305 corresponds to a conventional digital polar transmitter signal. Signal 310 corresponds to an ideal digital polar transmitter signal at the fundamental limit that indicates the minimum out-of-band noise in any digital polar transmitter based system. Signal 315 corresponds to a digital polar transmitter signal according to exemplary aspects of the present disclosure that include modulation correction processing, including amplitude and edge correction.

An ideal band-limited output signal corresponds to the following equation:

$$y_{ideal}(t) = A(t)*\cos(2\pi f_c t + \varphi(t)), \text{ with}$$

Where $A(t)=|I(t)^2+Q(t)^2|$, $\varphi(t)=\arg(I(t)+jQ(t))$, and $f_c$ denoting the carrier frequency.

For digital polar transmitters, a square wave signal is produced. The ideal output signal 310 ($y_{ideal}^{DTX}(t)$) corresponds to the following equation:

$$y_{ideal}^{DTX}(t) = A(t)*\text{sgn}(\cos(2\pi f_c t + \varphi(t))).$$

Generally, RFDACs are limited and unable to generate such an ideal signal because an ideal signal would require the capability of changing amplitude in continuous time. Therefore, the amplitude signal must be held constant from one edge location to the next edge location.

In an exemplary aspect, the zero crossing calculator 210 of the modulation correction processor 225 is configured to calculate (or otherwise determine) the time instances of zero crossings ($t_{zeros}^{k}$) of the phase modulated carrier signal. Based on the zero crossings, the modulation correction processor 225 is configured to generate an output signal $y^{DTX}(t)$ of a phase modulated carrier (e.g. $\cos(2\pi f_c t+\varphi(t))$) in which the amplitude is constant between two adjacent zero-crossing time instances $t_{zeros}^{k}$ and $t_{zeros}^{k+1}$. This signal corresponds to the following equation:

$$y^{DTX}(t) = A_{ZOH}(t)*\text{sgn}(\cos(2\pi f_c t + \varphi(t))), \text{ with}$$

$$A_{ZOH}(t) = A(t_{zeros}^{k}), \text{ for } t_{zeros}^{k} \leq t < t_{zeros}^{k+1}$$

Figure 4:
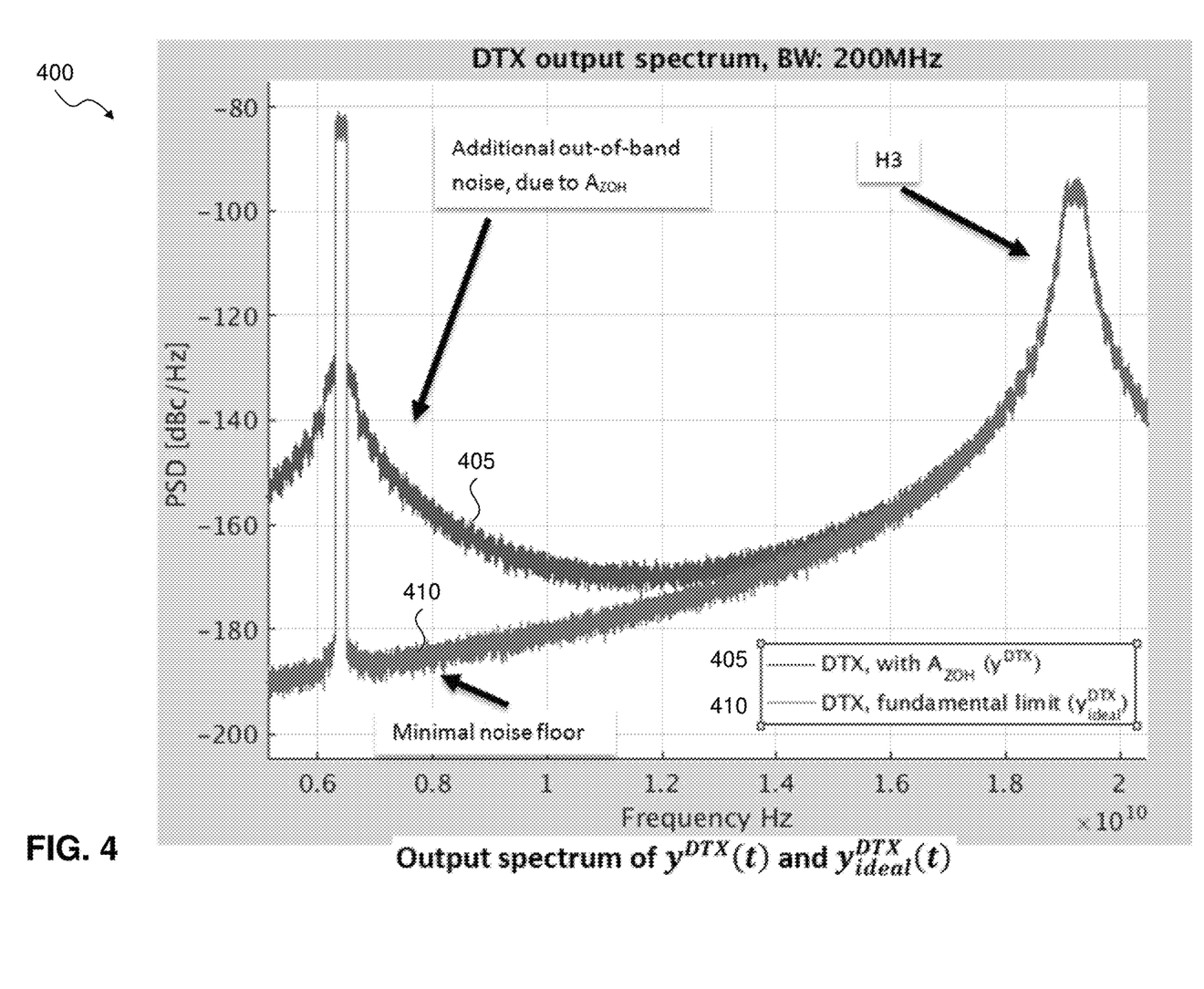
FIG. 4 illustrates a plot of polar transmitter output signal based on constant amplitude between zero crossings according to an exemplary aspect of the present disclosure.

As shown in FIG. 4, the output signal with a constant amplitude results in output signal 405, with the ideal output signal 410 shown for comparison. In this example, the output signal $y^{DTX}(t)$ and ideal signal 410 include a carrier frequency of 6.4 GHz and a modulation signal with 200 MHz transmission bandwidth. Further, both signals exhibit out-of-band noise from the third-harmonic (H3) as a result of the combination of A(t) and the harmonics of the modulated carrier. In this example, signal $y^{DTX}(t)$ (i.e. signal 405) shows an increased out-of-band noise compared to the ideal signal 410 because of the additional mixing products of harmonics and spectral replicas of constant amplitude $A_{ZOH}(t)$.

Figure 5:
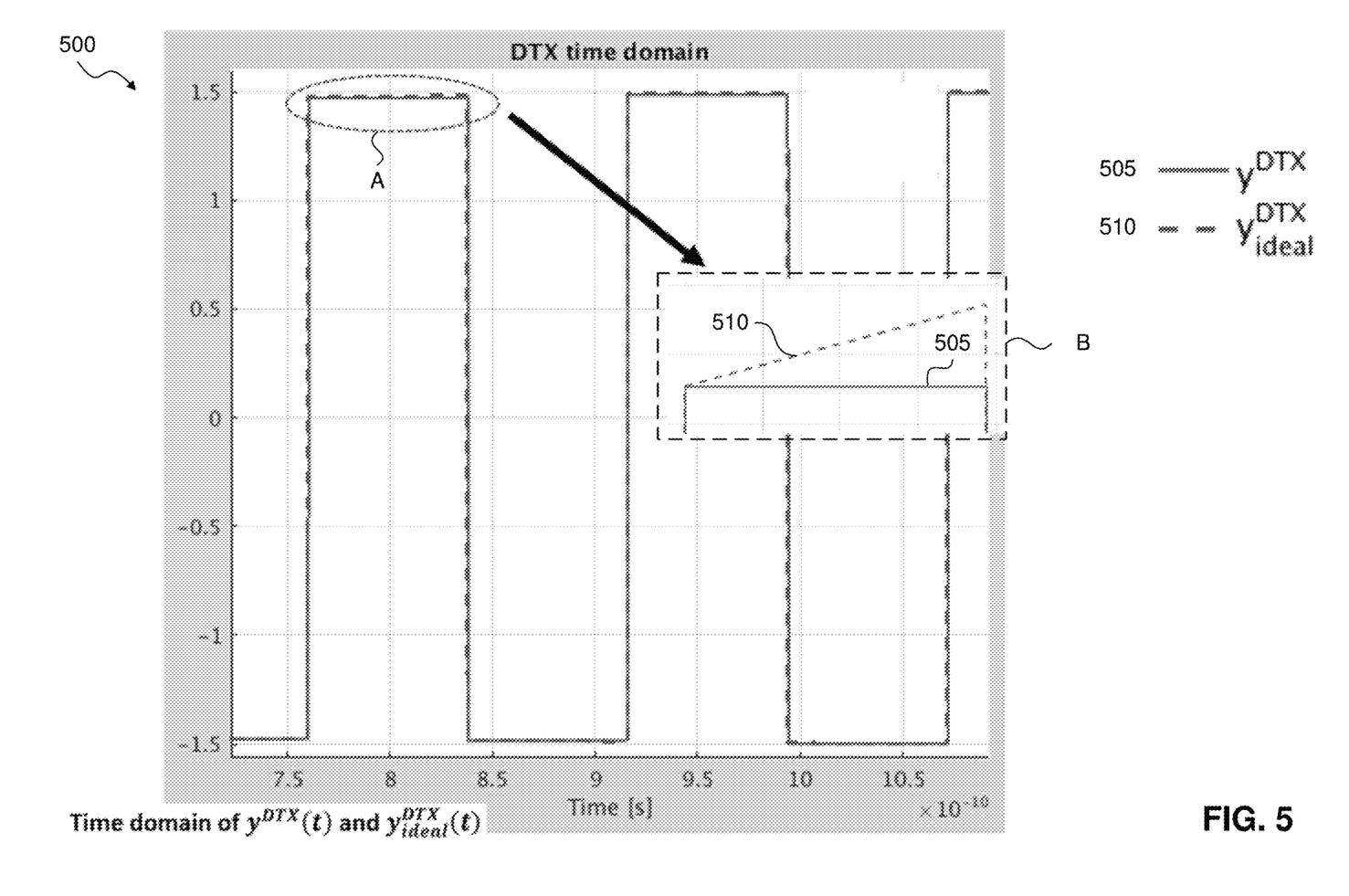
FIG. 5 illustrates a time domain plot of polar transmitter output signals based on constant and continuous amplitude between zero crossings according to an exemplary aspect of the present disclosure.
Figure 6:
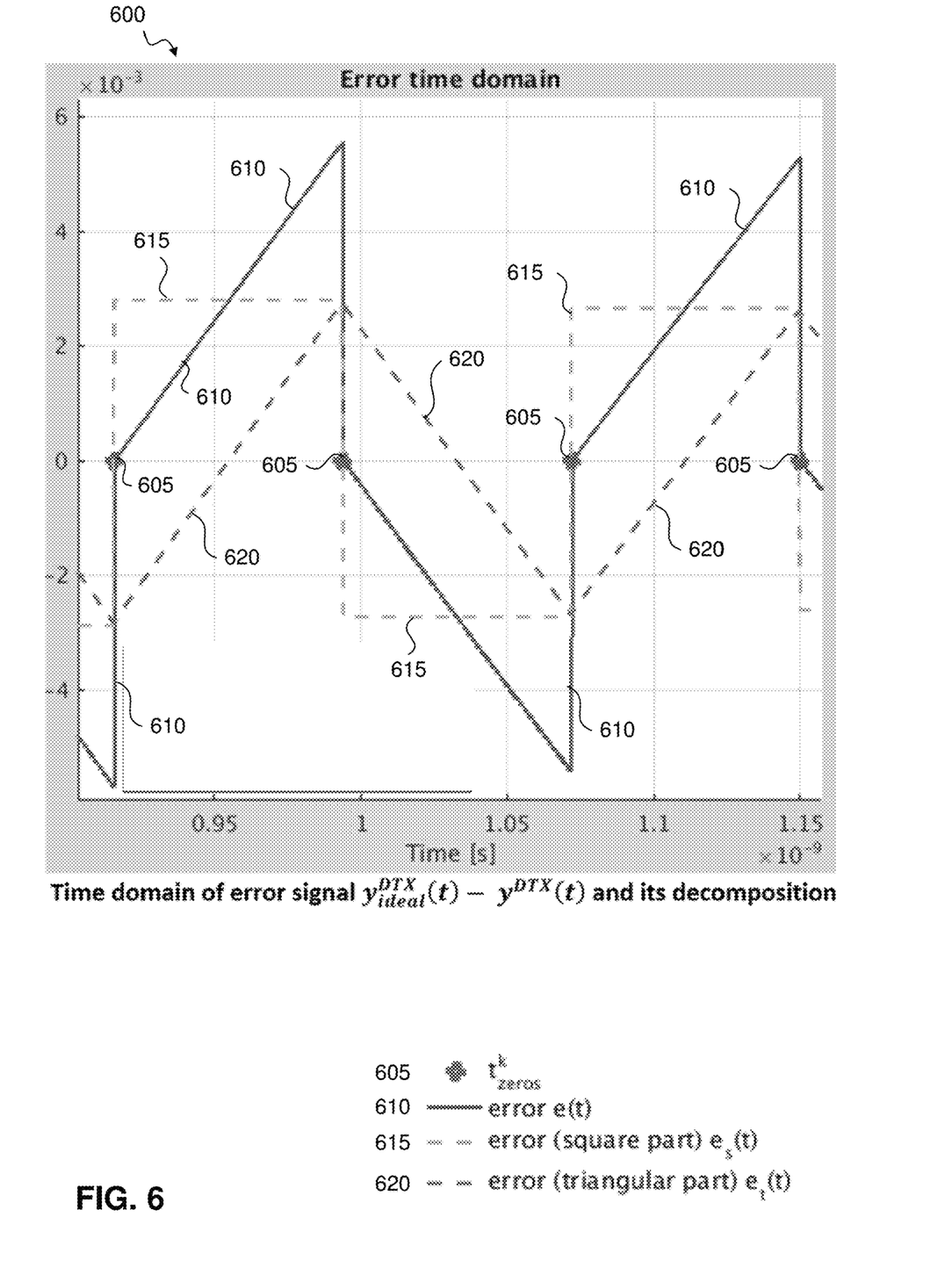
FIG. 6 illustrates a plot of an error signal between continuous and constant amplitude polar transmitter output signals and its decomposition according to an exemplary aspect of the present disclosure.

With references to FIGS. 5 and 6, in an exemplary aspect, the modulation correction processor 225 (e.g. amplitude calculator 215) is configured to adjust the output signal $y^{DTX}(t)$ having a constant amplitude based on the ideal signal $y_{ideal}^{DTX}(t)$ such that the out-of-band emission decrease to approach the fundamental limit around the carrier frequency. As shown in FIG. 5, signals $y^{DTX}(t)$ and $y_{ideal}^{DTX}(t)$ are shown in the time domain. The area A is enlarged as shown in area B, which emphasizes the difference between the ideal signal 510 ($y_{ideal}^{DTX}(t)$) having continuous amplitude and the output signal 505 ($y^{DTX}(t)$) having a constant amplitude. Based on these two signals, the modulation correction processor 225 (e.g. amplitude calculator 215) is configured to determine an error e(t) between the signals that satisfies the following equations:

$$e(t) = y_{ideal}^{DTX}(t) - y^{DTX}(t)$$

The error signal e(t) 610 can be decomposed into a square wave signal $e_s(t)$ 615 and a triangular signal $e_t(t)$ 620 as shown in FIG. 6. The zero crossings 605 are also illustrated.

In an exemplary aspect, the error signals $e_s(t)$ 615 and $e_t(t)$ 620 can be approximated via its Fourier series expansion. The approximation for the error square wave signal $e_s(t)$ 615 satisfies the following equation:

$$\tilde{e}_s(t) = \tilde{A}_e(t) \sum_{k=1}^{\infty} \tilde{a}_e(k) \cos(k(2\pi f_c + \varphi(t))), \text{ with}$$

$$\tilde{A}_e(t) = \frac{A(t_{zeros}^{k+1}) - A(t_{zeros}^k)}{2}, \text{ for } t_{zeros}^k \le t < t_{zeros}^{k+1}$$

(approximated error envelope)

$$\tilde{a}_e(k) = \frac{4}{k\pi} \sin\left(\frac{k\pi}{2}\right) \text{ for } k > 0$$

The approximation for the error triangular signal $e_t(t)$ 620 satisfies the following equation:

$$\tilde{e}_t(t) = \tilde{A}_e(t) \sum_{k=1}^{\infty} \tilde{b}_e(k) \sin(k(2\pi f_c + \varphi(t))), \text{ with}$$

$$\tilde{b}_e(k) = \begin{cases} \frac{8}{\pi^2} \frac{(-1)^{k-1/2}}{k^2}, & k \in \{2n+1: n \in Z\} \\ 0, & k \in \{2n: n \in Z\} \end{cases}$$

In an exemplary aspect, the modulation correction processor 225 (e.g. amplitude calculator 215) is configured to compensate for the square wave error signal $e_s(t)$ based on the amplitude between adjacent zero crossings. In an exemplary aspect, amplitude calculator 215 is configured to calculated (or otherwise determine—e.g. sample the amplitude value at $A_{\tilde{e}}(t)$ or substantially at $A_{\tilde{e}}(t)$) an adjusted amplitude based on the continuous amplitude between adjacent edge locations $t_{zeros}^k$ and $t_{zeros}^{k+1}$. In an exemplary aspect, the amplitude calculator 215 is configured to determine the average of the continuous amplitude between adjacent edge locations $t_{zeros}^k$ and $t_{zeros}^{k+1}$ to determine the adjusted amplitude $A_{\tilde{e}}(t)$. For example, the amplitude calculator 215 is configured to determine the adjusted amplitude $A_{\tilde{e}}(t)$ based on the following equation, which corresponds to an approximated error envelope:

$$\tilde{A}_e(t) = \frac{A(t_{zeros}^{k+1}) - A(t_{zeros}^k)}{2}, \text{ for } t_{zeros}^k \le t < t_{zeros}^{k+1}$$

That is, the amplitude is determined to be held constant from edge location to edge location at the average value $$\frac{A(t_{zeros}^{k+1}) + A(t_{zeros}^k)}{2}$$

from edge location $t_{zeros}^k$ to edge location $t_{zeros}^{k+1}$.

In an exemplary aspect, to compensate for the square wave error signal $e_s(t)$, the modulation correction processor 225 (e.g. amplitude calculator 215) is configured to calculate the signed amplitude based on the following equation:

$$\tilde{A}[k] = \frac{A(t_{zeros}^{k+1}) + A(t_{zeros}^k)}{2} * \text{sgn}\left(\cos\left(2\pi f_c \frac{t_{zeros}^k + t_{zeros}^{k+1}}{2} + \varphi\left(\frac{t_{zeros}^k + t_{zeros}^{k+1}}{2}\right)\right)\right)$$

In this example, the signed amplitude $\tilde{A}[k]$ corresponds to sampling the signed amplitude at the time instance $$\frac{t_{zeros}^k + t_{zeros}^{k+1}}{2}.$$

In an exemplary aspect, the modulation correction processor 225 (e.g. edge shift calculator 220) is configured to compensate for the triangular error signal $e_t(t)$ 620 based on the edge locations $t_{zeros}^k$ and $t_{zeros}^{k+1}$.

Figure 7:
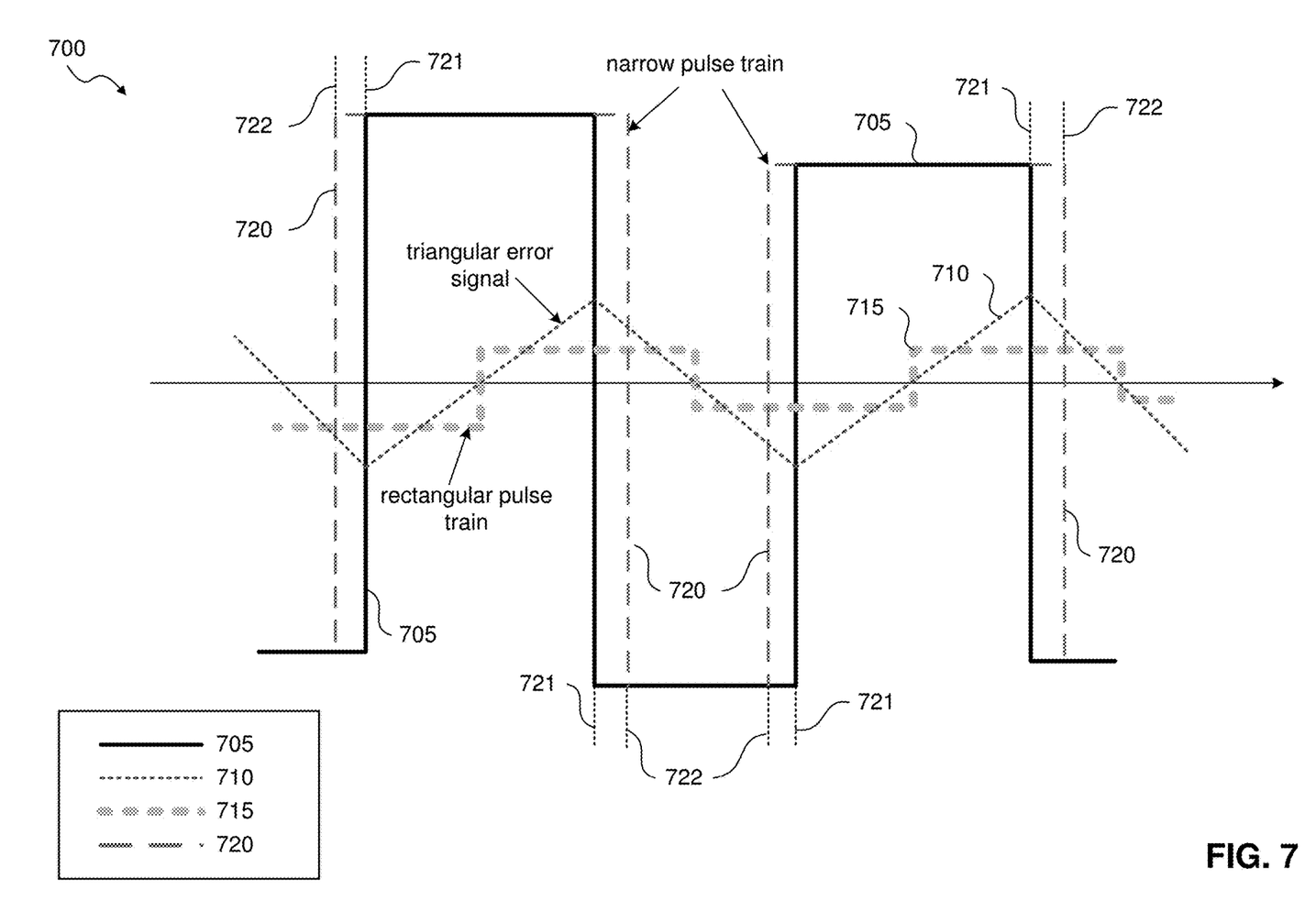
FIG. 7 illustrates a plot of an error signal and compensated signal according to an exemplary aspect of the present disclosure.

In an exemplary aspect, with reference to FIG. 7, the modulation correction processor 225 (e.g. edge shift calculator 220) is configured to shift the edge locations $t_{zeros}^k$ to $t_{zeros\_shift}^k$ to reduce or otherwise compensate for the triangle error signal $e_t(t)$ component. In an exemplary aspect, the shifting of edge locations is based on (e.g. located around the centers of) the triangle error signal $e_t(t)$ to reduce or otherwise compensate for the triangle error signal $e_t(t)$ component. In an exemplary aspect, the shifting of edge locations corresponds to the construction or otherwise determination of a narrow pulse train 720. In this example, the narrow pulse train 720 has the same amplitude (e.g. same height) as $y^{DTX}(t)$ and will have one edge location 721 that corresponds to the edge location of $y^{DTX}(t)$ signal 705 and a second edge location 722 that is a shifted value from the existing (first) edge location 721. In an exemplary aspect, the shifting of the edge locations of the $y^{DTX}(t)$ signal 705 to edge locations 722 effectively results in the addition of this narrow pulse train 720 to the $y^{DTX}(t)$ signal 705.

In an exemplary aspect, the edge shift calculator 220 is configured to shift the edge locations $t_{zeros}^k$ to $t_{zeros\_shift}^k$ to construct the narrow pulse train 720. In an exemplary aspect, the shifting of the edge locations is based on the error signal e(t) 610 corresponding to the difference between signals $y^{DTX}(t)$ and $y_{ideal}^{DTX}(t)$, and the adjusted amplitude $A_{\tilde{e}}(t)$.

In an exemplary aspect, the edge shift calculator 220 is configured to shift the edge locations from $t_{zeros}^k$ to $t_{zeros\_shift}^k$ to correct the triangular error component (i.e.

error triangular signal $e_t(t)$ 620). In an aspect, the shifting satisfies the following equation:

$$t_{zeros\_shift}^k = t_{zeros}^k + \int_{\frac{t_{zeros}^{k-1}+t_{zeros}^{k}}{2}}^{\frac{t_{zeros}^{k}+t_{zeros}^{k+1}}{2}} y_{ideal}^{DTX}(t) - y^{DTX}(t)dt / (A^\sim[k-1] - A^\sim[k]) * C$$

with C=0.81 and is a constant to compensate for the fundamental part of $e_t(t)$. The value of C is not limited to this example value and can be determine through one or more simulations or calibration operations.

In an exemplary aspect, the modulation correction processor 225 is configured to construct a rectangular pulse train 715 and apply the rectangular pulse train 715 to $y^{DTX}(t)$ to reduce or otherwise compensate for the triangle error signal $e_t(t)$ component. The modulation correction processor 225 can construct the rectangular pulse train 715 instead of, or in addition to, shifting of the edge locations of the $y^{DTX}(t)$ signal 705 to edge locations 722 (e.g. applying the narrow pulse train 720 to $y^{DTX}(t)$) to reduce or otherwise compensate for the triangle error signal $e_t(t)$ component.

In an exemplary aspect, the rectangular pulse train 715 is scaled by a scaling factor λ to compensate for the fundamental component of $e_t(t)$ such that the compensation of the error is focus around the carrier frequency.

In an exemplary aspect, modulation correction processor 225 is configured to generate the rectangular pulse train 715 based on the Fourier series expansion as provided below:

$$u_{tc}(t) = \lambda A_e^\sim(t) \sum_{k=1}^{\infty} a_e^\sim(k) \cos\left(k(2\pi f_c + \varphi(t)) - \frac{\pi}{2}\right),$$

with the scaling factor $$\lambda = \frac{b_e^\sim(1)}{a_e^\sim(1)}.$$

In an exemplary aspect, in applying the correction rectangular pulse train 715 results in an effective second carrier with a π/2 offset to the main carrier $y^{DTX}(t)$. The second carrier is similar to the Q-component of an I/Q system, but with a much smaller Q component. In an exemplary aspect, the correction rectangular pulse train 715 has similar properties as that of the triangle error signal $e_t(t)$ near the main carrier $y^{DTX}(t)$ with respect to the spectrum. These similar properties allow for the rectangular pulse train 715 to compensate for the triangle error signal $e_t(t)$ component. That is, even though the error has a triangular wave shape, it exhibits similar properties of the square-wave-shaped rectangular pulse train 715 near the carrier. Therefore, the rectangular pulse train 715 can be used to compensate for the triangular component of the error signal e(t) near the carrier frequency.

In an exemplary aspect, modulation correction processor 225 is configured to generate a corrected output signal $y_{corrected}^{DTX}(t)$ based on the signed amplitude $A^\sim[k]$ (e.g. adjusted amplitude) and the shifted edge locations $t_{zeros\_shift}^k$. That is, the modulation correction processor 225 is configured to generate a square-wave output signal having an amplitude $A^\sim[k]$ for time periods between adjacent shifted edge locations $t_{zeros\_shift}^k$ and $t_{zeros\_shift}^{k+1}$. In an exemplary aspect, the corrected output signal satisfies the following equation:

$$y_{correct}^{DTX}(t) = A^\sim[k], \text{ for } t_{zeros\_shift}^k \leq t < t_{zeros\_shift}^{k+1}$$

Where:
the signed amplitude $A^\sim[k]$ is:

$$A^\sim[k] = \frac{A(t_{zeros}^{k+1}) + A(t_{zeros}^k)}{2} * \text{sgn}\left(\cos\left(2\pi f_c \frac{t_{zeros}^k + t_{zeros}^{k+1}}{2} + \varphi\left(\frac{t_{zeros}^k + t_{zeros}^{k+1}}{2}\right)\right)\right)$$

and shifted edge location $t_{zeros\_shift}^{k+1}$ is $$t_{zero\_shift}^k = t_{zeros}^k + \int_{\frac{t_{zeros}^{k-1}+t_{zeros}^{k}}{2}}^{\frac{t_{zeros}^{k}+t_{zeros}^{k+1}}{2}} y_{ideal}^{DTX}(t) - y^{DTX}(t)dt / (A^\sim[k-1] - A^\sim[k]) * C$$

Figure 8:
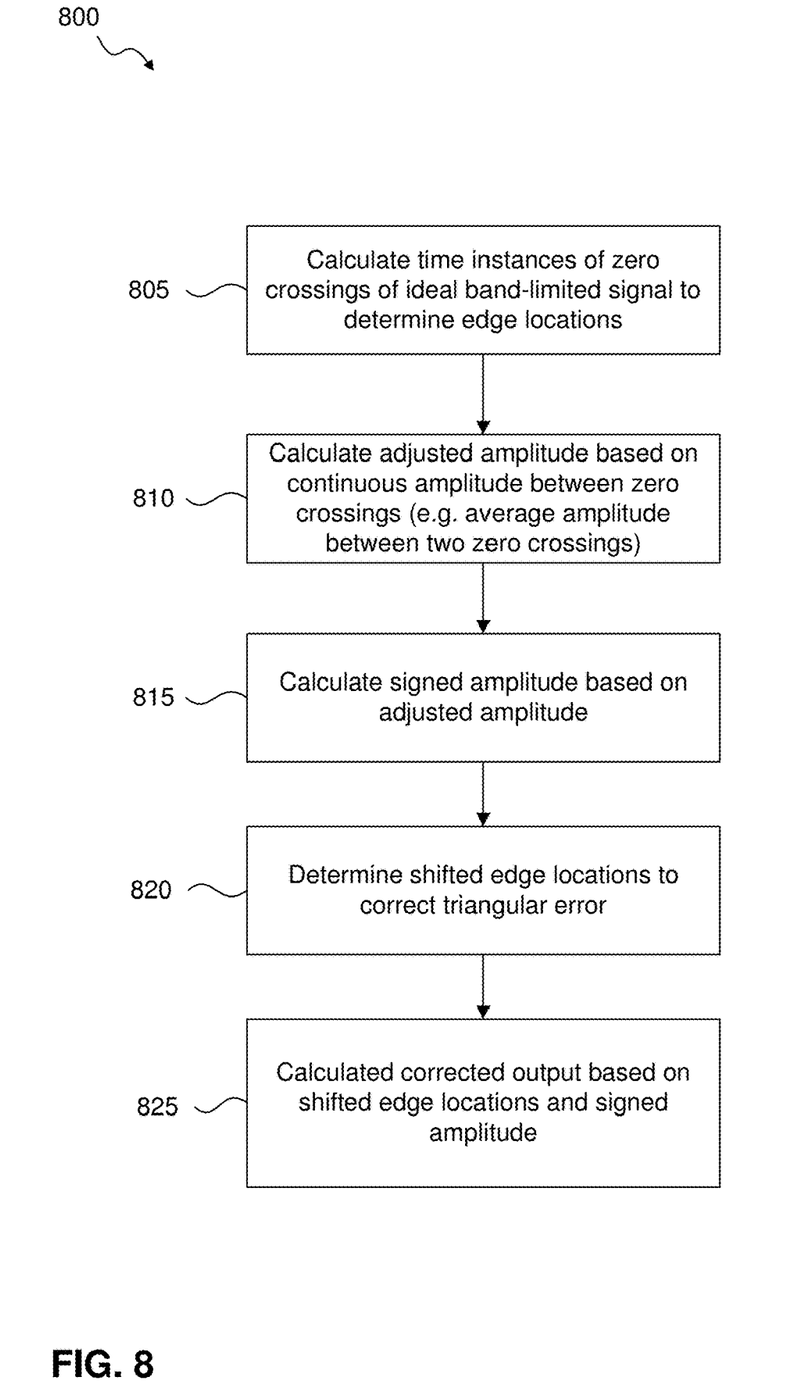
FIG. 8 illustrates a flowchart of an error compensation method according to exemplary aspects of the present disclosure.

FIG. 8 illustrates a flowchart 8 of a modulation correction method according to an exemplary aspect of the present disclosure. The flowchart 800 is described with continued reference to FIGS. 1-7. The operations of the methods are not limited to the order described below, and the various operations may be performed in a different order. Further, two or more operations of the methods may be performed simultaneously with each other. In an exemplary aspect, the polar transmitter 200 (e.g. modulation correction processor 225) is configured to perform the method of flowchart 800.

The method of flowchart 800 begins at operation 805, where time instances of zero crossings $t_{zeros}^k$ of ideal band-limited signal are calculated to determine edge locations.

In an exemplary aspect, the zero crossing calculator 210 of the modulation correction processor 225 is configured to calculate (or otherwise determine) the time instances of zero crossings ($t_{zeros}^k$) of the phase modulated carrier signal. Based on the zero crossings, the modulation correction processor 225 is configured to generate an output signal $y^{DTX}(t)$ of a phase modulated carrier (e.g. $\cos(2\pi f_c t+\varphi(t))$) in which the amplitude is constant between two adjacent zero crossing time instances $t_{zeros}^k$ and $t_{zeros}^{k+1}$. This signal corresponds to the following equation:

$$y^{DTX}(t) = A_{ZOH}(t) * \text{sgn}(\cos(2\pi f_c t + \varphi(t))), \text{ with}$$

$$A_{ZOH}(t) = A(t_{zeros}^k), \text{ for } t_{zeros}^k \leq t < t_{zeros}^{k+1}$$

After operation 805, the flowchart 800 transitions to operation 810, where an adjusted amplitude is calculated (or otherwise determined) based on the continuous amplitude between adjacent edge locations $t_{zeros}^k$ and $t_{zeros}^{k+1}$. In an exemplary aspect, the amplitude calculator 215 is configured to determine the average of the continuous amplitude between adjacent edge locations $t_{zeros}^k$ and $t_{zeros}^{k+1}$ determine the adjusted amplitude $A_{\tilde{e}}(t)$. For example, the amplitude calculator 215 is configured to determine the adjusted amplitude $A_{\tilde{e}}(t)$ based on the following equation, which corresponds to an approximated error envelope:

$$A_e^\sim(t) = \frac{A(t_{zeros}^{k+1}) - A(t_{zeros}^k)}{2}, \text{ for } t_{zeros}^k \leq t < t_{zeros}^{k+1}$$

After operation 810, the flowchart 800 transitions to operation 815, where the signed amplitude is calculated based on the adjusted amplitude between adjacent zero crossings (e.g. average amplitude between adjacent zero crossings). The calculation of the signed amplitude compensates for the square wave component $e_s(t)$ of the error signal.

In an exemplary aspect, the amplitude calculator 215 is configured to calculate the signed amplitude $A\tilde{\ }[k]$ based on adjacent zero-crossing time instances $t_{zeros}^k$ and $t_{zeros}^{k+1}$ to satisfy the following equation:

$$A\tilde{\ }[k] = \frac{A(t_{zeros}^{k+1}) + A(t_{zeros}^k)}{2} * \mathrm{sgn}\left(\cos\left(2\pi f_c \frac{t_{zeros}^k + t_{zeros}^{k+1}}{2} + \varphi\left(\frac{t_{zeros}^k + t_{zeros}^{k+1}}{2}\right)\right)\right)$$

After operation 815, the flowchart 800 transitions to operation 820, where shifted edge locations are determined (e.g. generating a narrow pulse train to be applied to the carrier signal) to compensate of the triangular component $e_t(t)$ of the error signal.

In an exemplary aspect, the edge shift calculator 220 is configured to shift the edge locations $t_{zeros}^k$ to $t_{zeros\_shift}^k$ (e.g. to effectively construct the narrow pulse train 720). In an exemplary aspect, the shifting of the edge locations is based on the error signal e(t) 610 corresponding to the difference between signals $y^{DTX}(t)$ and $y_{ideal}^{DTX}(t)$ and the adjusted amplitude $A_{\tilde{e}}(t)$.

In an exemplary aspect, the edge shift calculator 220 is configured to shift the edge locations from $t_{zeros}^k$ to $t_{zeros\_shift}^k$ to correct the triangular error component (i.e. error triangular signal $e_t(t)$ 620). In an aspect, the shifting satisfies the following equation:

$$t_{zeros\_shift}^k =$$
$$t_{zeros}^k + \int_{\frac{t_{zeros}^{k-1}+t_{zeros}^k}{2}}^{\frac{t_{zeros}^k+t_{zeros}^{k+1}}{2}} y_{ideal}^{DTX}(t) - y^{DTX}(t)dt/(A\tilde{\ }[k-1] - A\tilde{\ }[k]) * C$$

with C=0.81 and is a constant to compensate for the fundamental part of $e_t(t)$. The value of C is not limited to this example value and can be determine through one or more simulations or calibration operations.

After operation 820, the flowchart 800 transitions to operation 825, where a corrected output signal $y_{corrected}^{DTX}(t)$ is generated based on the signed amplitude $A\tilde{\ }[k]$ (e.g. adjusted amplitude) and the shifted edge locations $t_{zeros\_shift}^k$.

In an exemplary aspect, modulation correction processor 225 is configured to generate a corrected output signal $y_{corrected}^{DTX}(t)$ based on the signed amplitude $A\tilde{\ }[k]$ (e.g. adjusted amplitude) and the shifted edge locations $t_{zeros\_shift}^k$. That is, the modulation correction processor 225 is configured to generate a square-wave output signal having an amplitude $A\tilde{\ }[k]$ for time periods between adjacent shifted edge locations $t_{zeros\_shift}^k$ and $z_{zeros\_shift}^{k+1}$. In an exemplary aspect, the corrected output signal satisfies the following equation:

$$y_{corrected}^{DTX}(t) = A\tilde{\ }[k], \text{ for } t_{zero\_shift}^k \leq t < t_{zeros\_shift}^{k+1}$$

Examples

Example 1 is a modulation correction method, comprising: determining an adjusted amplitude based on an amplitude between adjacent zero crossings of a modulated signal; shifting the adjacent zero crossings to determine shifted zero crossings; adapting the modulated signal based on the adjusted amplitude and the shifted zero crossings to generate a corrected modulated signal corresponding to the modulated signal.

Example 2 is the subject matter of Example 1, wherein determining the adjusted amplitude comprises calculating an average amplitude between adjacent zero crossings of the modulated signal.

Example 3 is the subject matter of any of Examples 1-2, wherein the amplitude between adjacent zero crossings of the modulated signal is a continuous amplitude.

Example 4 is the subject matter of any of Examples 1-3, further comprising determining the adjacent zero crossings based on time instances of zero crossings of an ideal band-limited signal.

Example 5 is the subject matter of any of Examples 1-4, wherein the determination of the shifted zero crossings produces a narrow pulse train having an amplitude that is equal to the adjusted amplitude.

Example 6 is the subject matter of any of Examples 1-5, further comprising calculating a difference between an ideal band-limited signal and the modulated signal to determine an error of the modulated signal.

Example 7 is the subject matter of Example 6, further comprising determining a triangular wave error signal component of the error signal and a square wave error signal component of the error signal.

Example 8 is the subject matter of Example 7, wherein the shifting of the adjacent zero crossings compensates for the triangular wave error signal component of the modulated signal.

Example 9 is the subject matter of Example 7, wherein the adjusted amplitude compensates for the square wave error signal component of the modulated signal.

Example 10 is the subject matter of Example 7, wherein the shifting of the adjacent zero crossings compensates for the triangular wave error signal component of the modulated signal and the adjusted amplitude compensates for the square wave error signal component of the modulated signal.

Example 11 is the subject matter of any of Examples 1 and 3-10, wherein determining the adjusted amplitude comprises calculating an average amplitude between adjacent zero crossings of the modulated signal.

Example 12 is a modulation correction method, comprising: determining adjacent zero crossings of a modulated signal to determine edge locations of a signal pulse of the modulated signal; determining a difference between an amplitude of an ideal band-limited signal and the amplitude of the modulated signal between adjacent zero crossings to determine an error signal of the modulated signal; processing the modulated signal to compensate for the error signal of the modulated signal; and generating a corrected modulated signal based on the processed moduated signal.

Example 13 is the subject matter of Example 12, wherein the error signal comprises a triangular wave error signal component and a square wave error signal component.

Example 14 is the subject matter of any of Examples 12-13, wherein the processing the modulated signal comprises adjusting an amplitude of the modulated signal based on the edge locations of the signal pulse to compensate for a square wave error signal component of the error signal.

Example 15 is the subject matter of any of Examples 12-14, wherein the processing the modulated signal further comprises shifting the adjacent zero crossings to compensate for a triangular wave error signal component of the error signal.

Example 16 is the subject matter of any of Examples 12-15, wherein the processing the modulated signal further comprises applying a scaled pulse train offset from the modulated signal to the modulated signal to compensate for a triangular wave error signal component of the error signal.

Example 17 is a non-transitory computer-readable medium comprising program instructions, when executed, causes a processor to perform the method of any of Examples 1-16.

Example 18 is an apparatus comprising means to perform the operations of any of Examples 1-16.

Example 19 is a wireless communication device comprising means to perform the operations of any of Examples 1-16.

Example 20 is a polar transmitter comprising: a zero-crossing calculator configured to calculate adjacent zero crossings of a signal; an amplitude calculator configured to calculate an adjusted amplitude of the signal based on an amplitude between the adjacent zero crossings of the signal; an edge-shift calculator configured to shift the adjacent zero crossings to generate corresponding shifted zero crossings of the signal; and a radio-frequency (RF) digital-to-analog converter (DAC) configured to generate a corrected modulated signal based on the adjusted amplitude and the shifted zero crossings of the signal.

Example 21 is the subject matter of Example 20, wherein calculating the adjusted amplitude comprises calculating an average amplitude between adjacent zero crossings of the modulated signal.

Example 22 is the subject matter of any of Examples 20-21, wherein the adjusted amplitude compensates for a square wave error signal component of the signal and the shifted zero crossings compensate for a triangular wave error signal component of the signal.

Example 23 is a communication device comprising the polar transmitter of any of Examples 20-22.

Example 24 is a polar transmitter comprising: means for calculating adjacent zero crossings of a signal; means for calculating an adjusted amplitude of the signal based on an amplitude between the adjacent zero crossings of the signal; means for shifting the adjacent zero crossings to generate corresponding shifted zero crossings of the signal; and means for generating a corrected modulated signal based on the adjusted amplitude and the shifted zero crossings of the signal.

Example 25 is the subject matter of Example 24, wherein calculating the adjusted amplitude comprises calculating an average amplitude between adjacent zero crossings of the modulated signal.

Example 26 is the subject matter of any of Examples 24-25, wherein the adjusted amplitude compensates for a square wave error signal component of the signal and the shifted zero crossings compensate for a triangular wave error signal component of the signal.

Example 27 is a communication device comprising the polar transmitter of any of Examples 24-26.

Example 28 is an apparatus substantially as shown and described.

Example 29 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to communication protocols that utilize the millimeter wave (mmWave) spectrum (e.g., 24 GHz-300 GHz), such as WiGig (IEEE 802.11ad and/or IEEE 802.11ay) which operates at 60 GHz, and/or one or more 5G protocols using, for example, the 28 GHz frequency spectrum. The exemplary aspects can be applied to other wireless communication protocols/standards (e.g., LTE or other cellular protocols, other IEEE 802.11 protocols, etc.) as would be understood by one of ordinary skill in the relevant arts.

What is claimed is:

1. A modulation correction method, comprising:
   determining an adjusted amplitude by determining an average change in amplitude between adjacent zero crossings of a modulated signal;
   shifting the adjacent zero crossings to determine shifted zero crossings; and
   adapting the modulated signal based on the adjusted amplitude and the shifted zero crossings to generate a corrected modulated signal corresponding to the modulated signal.

2. The method of claim 1, wherein the change in amplitude between adjacent zero crossings of the modulated signal is a continuous change in amplitude.

3. The method of claim 1, further comprising:
   determining the adjacent zero crossings based on time instances of zero crossings of an ideal band-limited signal.

4. The method of claim 1, wherein the determination of the shifted zero crossings produces a narrow pulse train having an amplitude that is equal to the adjusted amplitude.

5. The method of claim 1, further comprising:
   calculating a difference between an ideal band-limited signal and the modulated signal to determine an error of the modulated signal.

6. The method of claim 5, further comprising:
   determining a triangular wave error signal component of the error signal and a square wave error signal component of the error signal.

7. The method of claim 6, wherein the shifting of the adjacent zero crossings compensates for the triangular wave error signal component of the modulated signal.

8. The method of claim 6, wherein the adjusted amplitude compensates for the square wave error signal component of the modulated signal.

9. The method of claim 6, wherein the shifting of the adjacent zero crossings compensates for the triangular wave error signal component of the modulated signal and the adjusted amplitude compensates for the square wave error signal component of the modulated signal.

10. A non-transitory computer-readable medium comprising program instructions, when executed, cause a processor to perform the method of claim 1.

11. The method of claim 1, wherein the change in amplitude between adjacent zero crossings of the modulated signal is a continuous change in amplitude, and
   wherein the corrected modulated signal has a constant amplitude between adjacent zero crossings of the corrected modulated signal that correspond to the adjacent zero crossings of the modulated signal.

12. The method of claim 1, wherein the adjacent zero crossings of the corrected modulated signal have an amplitude equal to an average of the change in amplitude between the corresponding adjacent zero crossings of the modulated signal.

13. A modulation correction method, comprising:
   determining adjacent zero crossings of a modulated signal to determine edge locations of a signal pulse of the modulated signal;
   determining a difference between a change in amplitude of an ideal band-limited signal between adjacent zero crossings and an average change in amplitude of the modulated signal between adjacent zero crossings to determine an error signal of the modulated signal;
   processing the modulated signal to compensate for the error signal of the modulated signal; and
   generating a corrected modulated signal based on the processed moduated signal.

14. The method of claim 13, wherein the error signal comprises a triangular wave error signal component and a square wave error signal component.

15. The method of claim 13, wherein processing the modulated signal comprises adjusting an amplitude of the modulated signal based on the edge locations of the signal pulse to compensate for a square wave error signal component of the error signal.

16. The method of claim 15, wherein processing the modulated signal further comprises shifting the adjacent zero crossings to compensate for a triangular wave error signal component of the error signal.

17. The method of claim 15, wherein processing the modulated signal further comprises:
   applying a scaled pulse train offset from the modulated signal to the modulated signal to compensate for a triangular wave error signal component of the error signal.

18. A polar transmitter, comprising:
   a zero-crossing calculator configured to calculate adjacent zero crossings of a signal;
   an amplitude calculator configured to calculate an adjusted amplitude of the signal by determining an average change in amplitude between the adjacent zero crossings of the signal;
   an edge-shift calculator configured to shift the adjacent zero crossings to generate corresponding shifted zero crossings of the signal; and
   a radio-frequency (RF) digital-to-analog converter (DAC) configured to generate a corrected modulated signal based on the adjusted amplitude and the shifted zero crossings of the signal.

19. The polar transmitter of claim 18, wherein the adjusted amplitude compensates for a square wave error signal component of the signal and the shifted zero crossings compensate for a triangular wave error signal component of the signal.

20. A communication device comprising the polar transmitter of claim 18.

* * * * *